3,553,328
STABLE CARBAMATE INSECTICIDE GRANULES
Theodore H. Koundakjian, Berkeley, Calif., assignor to Chevron Research Company, San Francisco, Calif., a corporation of Delaware
No Drawing. Filed Feb. 28, 1967, Ser. No. 619,148
Int. Cl. A01n 9/20
U.S. Cl. 424—300                                 7 Claims

ABSTRACT OF THE DISCLOSURE

Shelf-stable granular insecticide formulations containing m-alkylphenyl-N-methylcarbamate such as m-amylphenyl-N-methylcarbamate, an absorbent clay or amorphous mineral silica which have pH's of less than about 7 measured in a 10 wt. percent slurry and contain less than about 8 wt. percent water and about 0.5 to 5 wt. percent aliphatic carboxylic acid having a $pK_a$ of at least about 4, ethylacetoacetate, polyoxy alkylene partial ester of phosphoric acid or an aliphatic polyol having 2 to about 5 hydroxyl groups.

BACKGROUND OF THE INVENTION

This invention is directed to stable granular formulations of my-alkylphenyl-N-methylcarbamate insecticides.

The art has proposed formulating m-alkylphenyl-N-methylcarbamate insecticides as wettable powders using carriers such as talc, limestone and bentonite. However, there has been no mention of specific granular formulations of these carbamate insecticides. Talc is not absorbent enough to make suitable granules. Basic materials such as limestone, bentonite and attapulgite carriers do not give granules which are stable enough to withstand long storage periods. Storage stability is essential for if the toxicant level of the formulation falls below the guaranteed level, the toxicant must be replaced or, if possible, fortified.

INVENTION DESCRIPTION

It has now been found that m-alkylphenyl-N-methylcarbamate insecticides may be formulated into stable granular compositions using specific acidic clays and silicas and specific stabilizers. These new granular compositions comprise about 5 to 30% by wt. m-alkylphenyl-N-methylcarbamate insecticide, an absorbent clay or amorphous mineral silica having a pH of less than about 7, as measured in a 10% by wt. aqueous slurry and containing less than about 8 wt. percent water, and about 0.5 to 5 wt. percent aliphatic carboxylic acid having a $pK_a$ of at least about 4, ethylacetoacetate, polyoxyalkylene partial ester of phosphoric acid or an aliphatic polyol having 2 to about 5 hydroxyl groups.

The m-alkylphenyl - N - methylcarbamate insecticides which are used in the formulations of this invention are well known. They are now melting solids at ambient temperatures with good organic solvent stability and the alkyl groups of them contain 1 to about 6, usually 3 to 6, carbon atoms. Preferably, these alkyl groups are branched, i.e. a secondary or tertiary alkyl group. Examples of typical carbamates of this class are: m-propylphenyl-N-methylcarbamate, m-isopropylphenyl-N-methylcarbamate, m-sec.butylphenyl - N - methylcarbamate, m-tert.butylphenyl-N-methylcarbamate, m-sec.amylphenyl-N-methylcarbamate, m-sec.hexylphenyl - N - methylcarbamate 2-chloro-5-sec.amylphenyl - N - methylcarbamate, 2,6-dichloro-5-sec.butylphenyl-N-methylcarbamate, 2 - isopropoxyphenyl - N - methylcarbamate, 2-isopropylphenyl-N-methylcarbamate, 4-dimethylamino-3,5-xylenyl-N-methylcarbamate, 4-methylthio-3,5-xylene-N-methylcarbamate.

The clays and silicas which are used in the formulations of this invention have pH's (measured in a 10 wt. percent aqueous slurry of clay) in the range of about 4.5 and about 7.0. Naturally occurring clays having pH's within this range or acid treated clays with pH's in this range, may be used. The clays and silicas also have relatively low water contents, i.e. about 1 to 8% water, preferably about 1 to 4 wt. percent water, measured at 100° F. The clay or silica must be capable of absorbing about 10 to 100% of its own weight in carbamate insecticide. Examples of naturally occurring clays which may be used in this invention are acidic montmorillonoids and kaolinites. Other clays and silicas which may be used are cataloged in the art and do not require further exemplification.

The carboxylic acids used in this invention are aliphatic carboxylic acids, usually monocarboxylic, which may be olefinically unsaturated or saturated. The $pK_a$'s of these acids are at least about 4 and more usually between about 4 and 6. They contain 2 to about 18 carbon atoms. Examples of such carboxylic acids are acetic, propionic, valeric, citric, caprylic, undecanoic, lauric, myristic, stearic, oleic and linoleic acids. Acetic and citric acids are preferred.

The alkylene groups of the polyoxyalkylene partial esters of phosphoric acid which may be used in this invention contain 2 to 3 carbon atoms, i.e., ethylene and propylene. The number of alkylene groups in each polyoxyalkylene moiety will usually be 2 to about 70, more usually 4 to 24. These partial esters are usually mixtures of monopolyoxyalkylene phosphates and dipolyoxyalkylene phosphates. Structurally, they may be represented by the following general formulae:

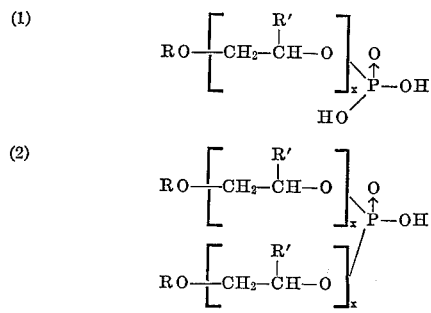

wherein R' is hydrogen or a methyl group, x is an integer from 2 to about 70, more usually from 4 to 24 and R is an aliphatic or aromatic hydrocarbyl group having about 7 to 40 carbon atoms. Typical R groups are dodecyl, tridecyl, tetradecyl, hexadecyl, octadecyl, octylphenyl, nonylphenyl, dodecylphenyl, dinonylphenyl, hexadecylphenyl, ditetradecylphenyl, dihexadecylphenyl, oleyl and linoleyl.

These mixtures of polyoxyalkylene acid phosphates are the reaction products of phosphorus pentoxide or phosphorus oxychloride with polyoxyalkylene ether-alcohols of fatty alcohols or alkyl phenols. Since these mixtures are reaction products, the relative proportions of mono- and diester will fluctuate depending upon the reaction conditions. Usually the reaction product will contain about 65 to 80 weight percent monoester and about 20 to 35 weight percent diester. If equilibrium is achieved, the reaction product will normally contain 69 to 71 weight percent monoester and 24 to 26 weight percent diester.

The di-to pentahydric alcohols which may be used in this invention conventionally have 2 to about 100 carbon atoms preferably about 2 to 10 carbon atoms. Such polyols include alkylene glycols, polyalkylene glycols, α,ω-diols, glycerol, alkylenetriols and polyalkylenetriols. Specific examples of typical polyols are ethylene glycol, propylene glycol, butylene glycol, diethylene glycol, tetraethylene glycol, 2-ethyl-1,3-hexanediol, glycerol, hexylene glycol, 1,2,6-hexanetriol and thiodiglycol. Glycols are preferred.

The granular compositions of this invention may be prepared by milling or blending the clay or silica to the desired particle size, contacting or mixing the particulate clay or silica with the acid, phosphate ester, glycol or ethylacetoacetate and then spraying a solution of the carbamate insecticide in an appropriate aliphatic or aromatic solvent, such as mixed hexanes, benzene, toluene, xylene and substituted naphthalenes. The concentration of the carbamate in solution is not critical and is usually in the range of about 50 to 90% by weight. The particle size of the granules of this invention are normally in the range of about 10 to 60 mesh.

In addition to the carbamate and acid, phosphate ester glycol or ethylacetoacetate other compatible insecticides, fungicides, plant growth regulators, herbicides, nematocides, attractants and sex sterilants may be incorporated into the granules if desired.

EXAMPLES

The following examples illustrate the granular compositions of this invention and their improved stability. These examples are in no way intended to limit the invention described herein.

Example 1

148.5 g. of a montmorillonoid clay (known commercialy as Pike's Peak J-6) having a pH of 5.0 in a 10% aqueous solution and containing 2.7% by weight water were milled to 20/40 mesh particles. 2.9 g. of glacial acetic acid were applied to the clay particles and then 28.6 g. of technical m-amylphenyl-N-methylcarbamate in 23 ml. xylene were sprayed onto the acid treated clay. A sample of this clay was extracted in acetone and the amount of m-amylphenyl-N-methylcarbamate in the extract was determined by gas liquid chromatographic analysis. Other samples of the granules were placed in containers and stored at either ambient temperature or 100° F. The stored samples were analyzed as above at various time intervals. The results of these analyses are reported below using the analysis at 0 days as a 100 base.

[Weight percent m-amylphenyl-N-methylcarbamate remaining ambient temp./100° F.]

| 15 days | 71 days | 159 days |
|---|---|---|
| —/92 | 90/89 | 88/86 |

Other granular formulations of m-amylphenyl-N-methylcarbamate on montmorillonoid clays (Pike's Peak) with various stabilizers were made and analyzed as in Example 1. The details of these are reported in Table I.

TABLE I

| Stabilizer | Weight percent of formulation | Weight percent m-amylphenyl-N-methylcarbamate ambient temp./100°.F. | |
|---|---|---|---|
| | | 15 days / 71 days | 159 days |
| Ex. No.: | | | |
| 2 Ethylacetoacetate | 1.2 | —/100   96/99 | 93/96 |
| 3 Polyoxyethylene ester of phosphoric acid.[1] | 1.2 | —/100   100/95 | 100/79 |
| 4 Ethylene glycol | 2.0 | —/100   100/100 | 100/99 |

[1] About 70% monester, 25% diester, R in formulas (1) and (2) above is tridecyl, $n$ is 15.

Example 5

79.0 g. of a high porosity amorphous mineral silica having a pH in a 10% aqueous slurry of about 6.8 and containing 3.2 wt. percent water was ground to 15/30 mesh particles. 2.0 g. of ethylene glycol were applied to the clay particles and then 15.2 g. of technical m-amylphenyl-N-methylcarbamate in 5 ml. heavy aromatic naphtha were sprayed onto the glycol treated clay. Samples were taken, stored at 100° F. and analyzed by the general procedure described in Example 1. After two months of storage 100% of the m-amylphenyl-N-methylcarbamate remained on the granules.

Example 6

The test reported in Example 5 was repeated except that an amorphous mineral silica having a pH in a 10% aqueous slurry of about 7 was used. After two months of storage 100% of the m-amylphenyl-N-methylcarbamate remained on the granules.

I claim:
1. Granular insecticidal composition comprising:
    (a) about 5 to 30 weight percent m-alkylphenyl-N-methylcarbamate insecticide in which the alkyl is of 1 to 6 carbon atoms;
    (b) an absorbent clay or amorphous mineral silica, said clay and silica having a pH of less than about 7 and less than about 8 weight percent water; and
    (c) about 0.5 to 5 weight percent of a member selected from the group consisting of aliphatic carboxylic acid having a $pK_a$ of about 4 to 6 and 2 to about 18 carbon atoms, ethylacetoacetate, aliphatic polyol having 2 to about 5 hydroxyl groups and 2 to 10 carbon atoms, and a mixture of

(1)
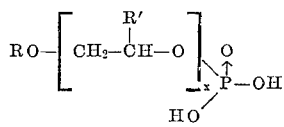

and (2)
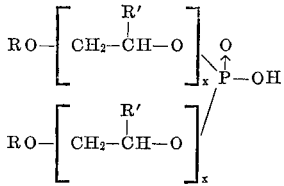

wherein R' is hydrogen or methyl, R is an aliphatic or aromatic hydrocarbyl group of about 7 to 40 carbon atoms and $x$ is an integer from 2 to 70, said mixture comprising about 65 to 80% by weight (1) and about 20 to 35% by weight (2).

2. The composition of claim 1 wherein the mesh size of the granules of the composition is in the range of about 10 to 60.

3. The composition of claim 1 wherein the alkyl group of the m-alkylphenyl-N-methyl carbamate contain 3 to 6 carbon atoms.

4. The composition of claim 1 wherein the clay and silica have pH's in the range of about 4.5 and about 7.0 and contain about 1 to 4 weight percent water.

5. The composition of claim 1 wherein the clay is a montmorillonoid.

6. The composition of claim 1 wherein the polyol is a glycol of 2 to 10 carbon atoms.

7. The composition of claim 1 wherein the m-alkylphenyl-N-methyl carbamate is m-amylphenyl-N-methyl-carbamate, the clay is a montmorillonoid, the aliphatic carboxylic acid is glacial acetic acid, R' is hydrogen and $x$ is an integer from 2 to 24, and the polyol is ethylene glycol.

References Cited

UNITED STATES PATENTS

| | | | |
|---|---|---|---|
| 2,954,397 | 9/1960 | Martinek et al. | 167—425XC |
| 2,970,080 | 1/1961 | Oros et al. | 167—42A |
| 3,010,903 | 11/1961 | Clarke et al. | 252—89 |
| 3,033,889 | 5/1962 | Chiddix et al. | 167—87.1 |

OTHER REFERENCES

Chem. Abstracts, Schoff et al., vol. 64, pp. 7302–7303 (note 7303a) 1966.

Chem. Ab., vol. 53, p. 7664(c), 1959 (Abstract of British Patent).

ALBERT T. MEYERS, Primary Examiner

V. D. TURNER, Assistant Examiner

U.S. Cl. X.R.

424—217, 311, 317, 343